(12) United States Patent
Kozlowski et al.

(10) Patent No.: US 8,857,147 B2
(45) Date of Patent: Oct. 14, 2014

(54) SELF CLEANING AND LUBRICATING ALL-WEATHER FISHING LINES AND METHODS OF MANUFACTURE THEREOF

(71) Applicant: Flow Tek, Inc., Boulder, CO (US)

(72) Inventors: Scott T. Kozlowski, Niwot, CO (US); Robert H. Goodale, Boulder, CO (US)

(73) Assignee: Flow Tek, Inc., Boulder, CO (US)

( * ) Notice: Subject to any disclaimer, the term of this patent is extended or adjusted under 35 U.S.C. 154(b) by 94 days.

(21) Appl. No.: 13/694,061

(22) Filed: Oct. 26, 2012

(65) Prior Publication Data
US 2014/0116021 A1    May 1, 2014

(51) Int. Cl.
*D02G 3/36*    (2006.01)
(52) U.S. Cl.
CPC .................................. *D02G 3/36* (2013.01)
USPC ........................................................ 57/250
(58) Field of Classification Search
CPC ....... A01K 91/00; A01K 91/12; D01D 11/06; D02G 3/336; D02G 3/36
USPC .................. 57/7, 8, 232, 241, 244, 250, 258; 43/44.98; 428/375; 427/501
See application file for complete search history.

(56) References Cited

U.S. PATENT DOCUMENTS

| | | | | |
|---|---|---|---|---|
| 3,043,045 A | * | 7/1962 | Martuch | 43/44.98 |
| 3,660,974 A | * | 5/1972 | Marzocchi et al. | 57/258 |
| 4,952,344 A | * | 8/1990 | Burgess | 264/40.1 |
| 5,625,976 A | | 5/1997 | Goodale | |
| 5,879,758 A | | 3/1999 | Goodale | |
| 6,321,483 B1 | * | 11/2001 | Kauss et al. | 43/44.98 |
| 7,406,797 B2 | * | 8/2008 | Harder et al. | 43/44.98 |
| 7,563,485 B2 | * | 7/2009 | Harder et al. | 427/402 |
| 8,387,170 B2 | * | 3/2013 | Green et al. | 2/411 |
| 2006/0048440 A1 | * | 3/2006 | Harder et al. | 43/44.98 |
| 2006/0172077 A1 | * | 8/2006 | Harder et al. | 427/430.1 |
| 2008/0127543 A1 | * | 6/2008 | Wothers | 43/44.98 |
| 2010/0132099 A1 | * | 6/2010 | Green et al. | 2/455 |

OTHER PUBLICATIONS

Callari, James L.; Study May Boost Prospects for Single-Screw 'Elongator'; Plastics Tchnology; Jan. 2012; p. 11; US.

* cited by examiner

*Primary Examiner* — Shaun R Hurley
(74) *Attorney, Agent, or Firm* — Harold A. Burdick

(57) ABSTRACT

Improved self cleaning and lubricating all-weather fishing lines and methods of manufacture are disclosed. The line includes a core line portion of polyester multifilament fiber and a coating portion, the coating formed by a thermoplastic polyester elastomer mixed with a blowing agent. The methods of this invention are characterized by the use of a finely ground powder of copolymer and blowing agent processed through a medical-quality elongated mixing screw at the line coating unit and very low processing temperatures.

20 Claims, 2 Drawing Sheets

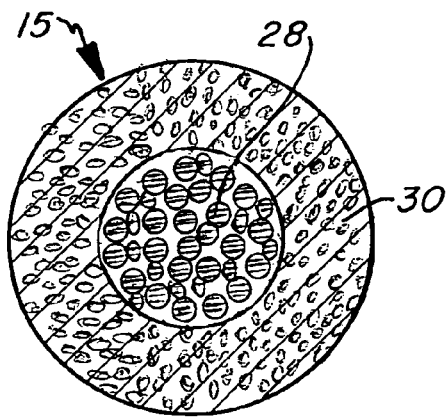
Fig_1
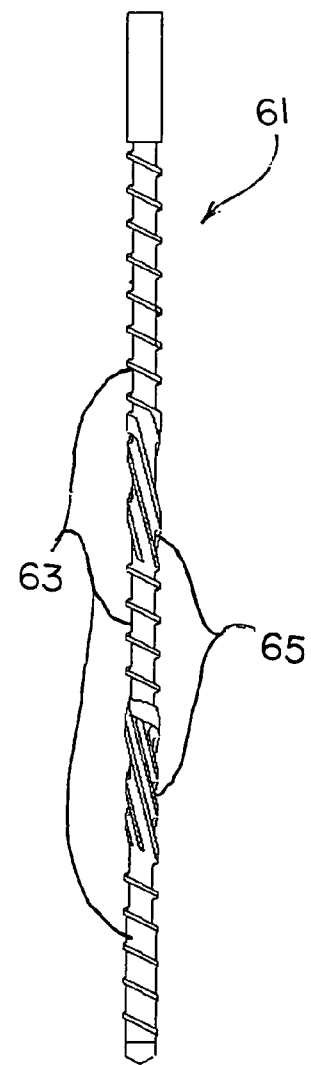
Fig_3B

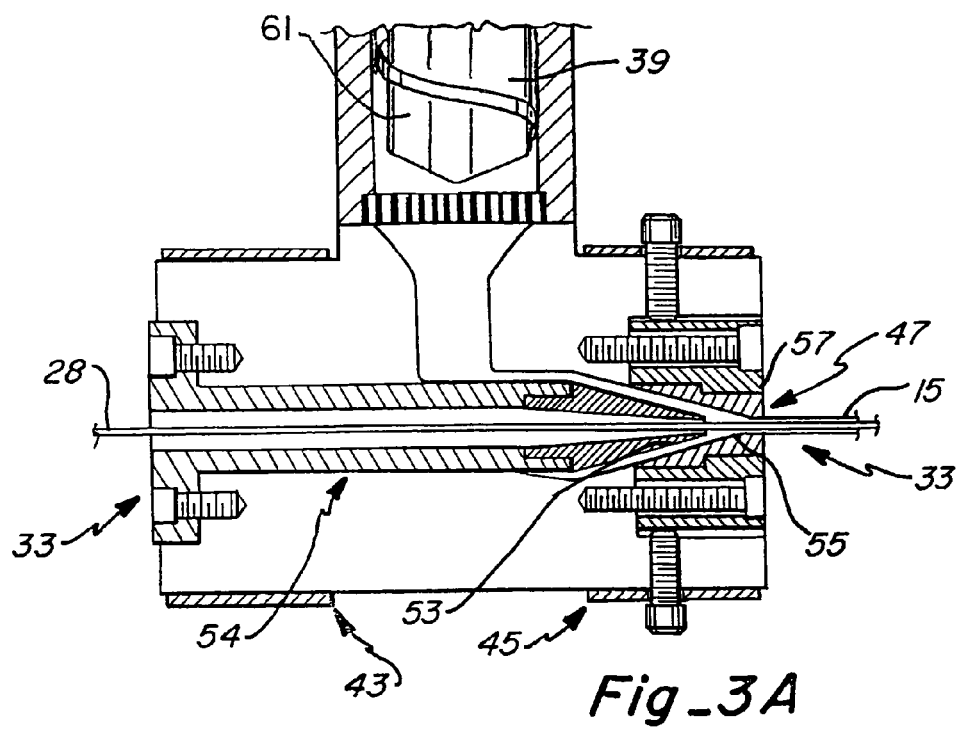
Fig_3A
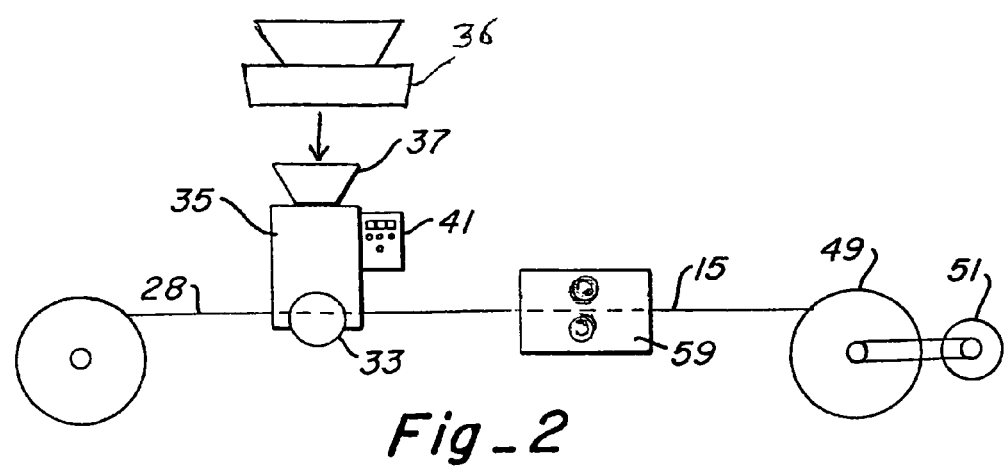
Fig_2

SELF CLEANING AND LUBRICATING ALL-WEATHER FISHING LINES AND METHODS OF MANUFACTURE THEREOF

FIELD OF THE INVENTION

This invention is related to fishing lines, and, more particularly, relates to all-weather fly fishing and spin fishing lines and methods of manufacture.

BACKGROUND OF THE INVENTION

Vinyl plastisol-based fishing lines are commercially dominant at present. Vinyl resin requires the addition of liquid plasticizer to achieve flexibility. A typical vinyl plastisol compound composition includes 100 parts vinyl plastisol resin, 60 parts liquid plasticizer, 2 to 3 parts liquid heat stabilizer, and pigment and blowing agent, glass microspheres or the like as may be required for the product desired. One problem with plasticizer usage in fishing line is that over time it exudates causing circumferential cracks and line degradation.

Plasticizer formulation is a critical factor in such lines. Too high a plasticizer loading results in limpness in the line and ineffective casting in tropical settings. Too low a plasticizer level causes rigidity and cumbersome handling in colder environs. Thus vinyl plastisol lines must be specifically formulated and designated for use in either tropical of cold temperature conditions. Chlorine (part of polyvinyl chloride resin) is a toxic ingredient. As is well known, PVC products of any kind are not biodegradable or degradable. Discarding of used or exhausted PVC lines is thus problematic, since they often end up in municipal landfills. Certain organizations have begun to argue for cessation of PVC production altogether since dioxin (a deadly man-made poison) is created during its manufacture and/or incineration. Fisheries advocates are now likewise beginning to take notice of the potential for habitat degradation posed by the use of vinyl plastisol-based fishing lines.

Prior non-vinyl plastisol-based lines have been utilized (see U.S. Pat. Nos. 5,625,976 and 5,879,758, for example). While effective in some applications such as fishing in tropical flats, such lines have not heretofore been altogether adaptable, particularly for demanding dry fly fishing. Furthermore, attempts to use blowing agents in fishing lines (vinyl and non-vinyl based) can in some formulations lead to rough surfaces finishes due to cell size of the foam created during processing.

Buoyant composite fishing lines heretofore known and/or utilized have included lines having a braided or multifilament core (often nylon) with a vinyl plastisol coating, with the coating having microspheroids blended thereinto to promote buoyancy. Line having a core made of fiber know as Kevlar with a polyester urethane coating which is foamed to provide a multiplicity of air pockets to promote buoyancy are also known (see, for example, U.S. Pat. No. 3,043,045 and the article by A. J. Hand appearing in the March 1988 issue of Rod and Reel magazine).

Other two component lines of various types have included those utilizing gelspun polyethylene multi-strand cores. These lines have not been heretofore favored in fishing lines due to the non-polar surface properties of the fiber, such properties not being conducive to chemical bond development leading to coating delamination.

Recently, to account for the poor bond developing qualities of the core, such two component lines have been manufactured in one of two ways. The first, involves a process of coating application at temperatures above the melt temperature of the core, providing an adhesive fused bond between the core and the coating. The second involves coating the core so as to penetrate the core, substantially entirely filling the interstices in the core material with the coating material thereby entraining the individual fibers of the core in the coating.

In both cases, the resulting line, while useful for some purposes, is not particularly well adapted for use in fly fishing lines. This is so because both processes provide a rather stiff, unyielding line, having few of the characteristics desired for fly casting. Moreover, where a braided core is utilized (preferable in fly line over twisted fibers, for example), the finish on such lines, particularly those produced by the high temperature method, is rough with some of the character of the braid exhibited on the finished surface of the line. In any case, the high temperature application of a coating (i.e., above the melt temperature of the core materials) would damage the core in fishing line manufacture, where coating thicknesses and thus processing times are such that exposure of the core to the elevated temperature is more significant than heretofore utilized by such methods.

From the foregoing, it is apparent that a relatively high test, all-weather fly fishing line could be utilized that is durable, retains desired casting, surface and storage characteristics, and that is environmentally responsible.

SUMMARY OF THE INVENTION

This invention provides fishing lines and manufacturing methods wherein the line produced is usable in all weather conditions, temperatures and climatic zones, that are self lubricating and self cleaning to maintain good handling and casting characteristics with a minimum of maintenance, that are non-cracking and thus durable and long lasting, and that are environmentally friendly.

The fishing line of this invention includes a multifilament fiber core having an outer coating applied thereover, the outer coating formed of powdered thermoplastic polyester elastomer and a blowing agent and characterized by a water absorption ratio (or "rate") of between about 0.05% and 3.0% (wt).

The manufacturing methods of this invention for making two component fishing line include pulling a multifilament fiber core through a crosshead die of an extruding unit at a selected rate. A mixture of a finely powdered polymer with a blowing agent is established in a mixer using an elongated mixing screw design. A melt is formed of the mixture at the extruding unit at melt processing temperatures below about 430° F. and applied over the core.

Since polyester elastomers are a very stable polymer structures and do not contain plasticizers, they are less susceptible to cracking. They are adaptable to all temperature usage ranges, and if carefully selected can be made to provide self cleaning and lubricating characteristics. They are non-toxic and environmentally friendly, line components being readily and safely degradable in landfills. The TPC-ET copolymers of the type used in the lines of this invention can be made of renewable and/or recycled resources.

It is therefore an object of this invention to provide improved non-vinyl-based fishing lines.

It is another object of this invention to provide two component floating fishing lines having a thermoplastic polyester elastomer-based material coating component.

It is still another object of this invention to provide improved fishing lines that are usable in all weather conditions, temperatures and climatic zones.

It is yet another object of this invention to provide improved fishing lines that are self lubricating and self cleaning to maintain good handling and casting characteristics with a minimum of maintenance.

It is still another object of this invention to provide improved fishing lines that are non-cracking and thus durable and long lasting, and that is environmentally friendly.

It is yet another object of this invention to provide improved fishing lines and methods that are based on copolymers that can be made of renewable and/or recycled resources.

It is still another object of this invention to provide a fishing line that includes a multifilament fiber core and an outer coating formed of powdered thermoplastic polyester elastomer and a blowing agent applied over the core the outer coating characterized by a water absorption ratio of between about 0.05% and 3.0% (wt).

It is yet another object of this invention to provide a method for manufacturing two component fishing line that includes the steps of pulling a multifilament fiber core through a crosshead die of an extruding unit at a selected rate, establishing a mixture of a finely powdered polymer with a blowing agent (preferably also powdered) in a mixer using an elongated mixing screw design, forming a melt of the mixture at the extruding unit at melt processing temperatures below 430° F., and applying the melt over the core in the extruding unit.

With these and other objects in view, which will become apparent to one skilled in the art as the description proceeds, this invention resides in the novel construction, combination, and arrangement of parts and methods substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which:

FIG. 1 is a cross sectional illustration of the fishing line of this invention;

FIG. 2 is a diagrammatic illustration of the method of manufacture of this invention; and FIGS. 3A and 3B are illustrations of a die and screw system used in the manufacturing methods of this invention.

DESCRIPTION OF THE INVENTION

Fly line and spin fishing line manufacture in accord with this invention is achieved using crosshead die extrusion whereby a core of polyester multifilament fiber (untwisted, twisted, or braided, preferably polyester, though other fiber material such as nylon or polyethylene could be utilized) is coated with polymer. The preferred polymer herein is a thermoplastic polyester elastomer, or TPC-ET, such as DuPont's HYTREL, Radici Group's HERAFLEX, Ticona's RITE-FLEX, or the like with properties both thermoplastic and elastomeric in nature. It is actually a block copolymer of hard (crystalline) segment of polybutylene terephthalate (PBT polyester resins) and a soft (amorphous) segment based on long chain polyether glycols. This polymer has a specific gravity of about 1.17 (grams/cm cubed) and requires blowing agents or the like to gain fly line floatability (agents creating gas bubbles when their critical temperature is reached). Blowing agents are very dependent on temperature, pressure and extruder barrel resident time for precise manufacture.

In weight forward, shooting head, or other tapered fly line constructions, a belly section and a running line section is provided. These sections are tapered electronically by varying line speed through the extruder die head. It is not necessary to prime the multifilament core to gain polymer adhesion, sufficient bond occurs mechanically due to internal pressures generated within the extruder.

Turning to FIG. 1, fishing line 15 of this invention is illustrated. The line includes a multifilament fiber core (preferably polyester) 28 and outer line coating 30 of the selected thermoplastic polyester elastomer and blowing agent formulation as discussed hereinbelow. As shown in FIG. 2, using a standard pellet feed a crosshead die extrusion unit as a starting point in manufacture, the polymer is ground to a fine powder and dry blended with azodicorbonamide blowing agent (CELOGEN AZNP by Lion Copolymer, LLC, for example) in blowing agent concentrations ranging from 0.25% to 2.0%. This mixture is coated onto multifilament polyester fiber 15 (preferably braided multifilament having a minimum number of individual filaments between 6 and 16, and having a breaking strength of 20 pounds, for example). The results produce a floating fly line.

As discussed below, large and non-uniform blowing agent foam cell structure, leading to rough finished line surface characteristics, must be avoided during manufacture. Best results occur when blowing agent concentration is fixed at about 0.4%. In addition since blowing agents are extremely temperature sensitive, lower process temperature are more conducive to line manufacture having acceptable surface smoothness. However, one limiting factor to lower process temperature has heretofore been the potential for damage to the extruder should the polymer not be in a sufficiently flowable state within the extruder barrel.

Thus, to assure proper surface characteristics, two process steps are utilized by this invention. First, the polymer used must be in powdered form (finely ground in nitrogen) so that a sufficiently small particle size (between 0.010" and 5 microns in size) is achieved, preferably sifted through a 60 mesh screen (opening size equal to about 0.009"). This step has been shown to achieve cell structure that is smaller in comparison to that achieved when polymer in pellet form is utilized. In powder form, blowing agent levels may be fixed at 0.4% to 1.5% depending on specific gravity desired (the preferred range of which is from 0.75-0.88). This step also allows use of lower melt temperatures (between 280° F. to below 430° F.) with no increase in extruder barrel internal pressure (lower barrel temperature further enhancing uniformity in the foam layer cell structure). The lower melt temperatures and better mixing achieved results in more predictable foaming agent bubble/cell size and smoother finished line surfaces.

The second process step for improving line surface smoothness integrity relates to problems caused by variable processing conditions in the extrusion unit. Producing a consistently high quality foamed polymer is dependent on conditions such as screw speed, barrel pressure, temperature, puller speed and resident time. Variable conditions during line processing, for example such as those used to produce lines having two distinct diameters in one line by pulling material out of the extruder at different rates, change the conditions inside the barrel/die of the extruder. To accommodate more variability in processing it has been found that better coating material mixing is required.

To achieve this advance mixing, use of a medical mixing screw such as the Randcastle RCP-0625 Elongator mixing screw used in the Elongational Mixer produced by Randcastle Extrusion Systems can improve stream mixing by about 125 times than is possible with a standard extruder screw design, even though both are single screw mixing systems. This screw is primarily used for medical formulations manufacture, but use of this screw in manufacture of the fishing line of this invention has been found to allow for control of conditions in a variable process wherein temperature, screw RPM, line pulling speed, and byproduct conditions such as extruder barrel pressure, are variable during production runs without appreciable loss or inconsistency of surface finish quality. Moreover, use of this mixer screw design allows concentrations of the polymer blends to be altered to enable different end properties of fishing line. For example, quantities of foaming agent for density compensation, slip agents (Croda ORX, for example), PTFE powder (such as TEFLON or POLYMIST, for example), Silicon (SILOXANE powder, for example) for lowering coefficient of friction, UV inhibitors (CIMASORB by Ciba Specialty Chemical, for example), and the like can all be adjusted without difficulty because they are also in powder form and thus mix easily with the powdered polymer.

Operationally, 1 to 10 RPM screw rotation speed (preferably around 3.2 RPM) and 280° to 430° F. processing temperature (preferably under 340° F.) are utilized. Polymer particle size of between about 0.010" to 5 microns (preferably 60 mesh screen) are utilized, with 0.25 to 5% blowing agent (preferably about 0.4%) 0.25 to 8% slip agent concentration (preferably about 1.5%), 0.5 to 20% PTFE concentration (preferably about 3%), 0.5 to 20% Silicon concentration (preferably about 5%), and 0.2 to 5% UV inhibitor (preferably about 0.5%), all percentages by weight. Puller speeds of about 3 to 40 ft/min. (average) depending on production stage (preferably about 15 ft/min. on average), and 10 to 2000 psi barrel pressure (preferably in the 250 to 400 psi range during center of line production) are employed. The preferred polymer used as a coating herein for floating fly lines is Thermoplastic Polyester Elastomer (TPC-ET) with a specific gravity of about 1.09.

One TPC-ET example well suited to this invention in DuPont HYTREL 4056. This polymer formulation has a tensile modulus of 53 MPa and a flexural modulus of about 62 MPa at 73° F. (from 27 MPa to 155 MPa from 212° F. down to −40°, respectively). Shore D Hardness is rated at 39, melt temperature optimum is 355° F., and melt mass-flow rate (374° F., 2.16 kg) at 5.6 g/10 min. Water absorption ratio (immersion 24 hours) is 0.6%.

Water absorption ratio (or "rate") is defined as the ratio of the weight of water absorbed by a material to the weight of the dry material in ASM Engineered Materials Handbook, Vol. 2: Engineering Plastics. The International Organization for Standards (at ISO 62:2008) defines standardized testing procedures to find the maximum weight of absorbed water to total weight of polymer. Polymers of the type described herein have a water absorption ratio of greater than about 0.5% (wt) and less than about 3% (wt), and as used in the preferred embodiment of this invention of about 0.6%. This offers two unique properties. First, the incremental absorption of water at the surface of the fishing line functions as a lubricant to enhance casting. Second, flushing action caused by the water at the surface of the line prevents dirt build-up minimizing the need for cleaning. This slight build-up of water does not, however, adversely affect floatability. The fishing line of this invention also exhibits significant versatility in most climatic and temperature conditions, exhibiting quality handling and casting characteristics at temperatures ranging from −10 deg. F to 140 deg. F. The fishing lines based on polymers described in this application do not contain any toxic groups in their molecular structures.

The properties displayed by this polymer system warrant its use not only as a floating fly line but also as a spin fishing line. In this application blowing agent would be used to gain floatability. Once again core material would be polyester multifilament using crosshead die extrusion in level line construction using a variety of core fiber breaking strengths.

Many polymers, such as PVA, HDPE, LDPE, LLDPE, ABS and the like, have not typically been considered for fishing lines, particularly fly fishing lines, due to surface roughness when blowing agents are incorporated into a pellet mix to gain floatability. Conversion of pellets into a powder via nitrogen grinding in combination with an elongated mixing screw processing will alleviate surface roughness and allow their consideration. Other critical fly line properties such as slickness (for casting), durability, memory, environmental impact and renewal resource status all influence polymer selection. The fly line described in this patent application meets all these criteria.

While not shown, the distal ends of the line may preferably be provided with loops for easy attachment of backing and leader. This procedure is done in a separate manufacturing operation utilizing polyethylene tubing.

Application of the coating materials to the core is illustrated in FIGS. 2 and 3A and 3B. Preferably, when utilizing blends, the selected different polymers are first dry mixed and extruded as discussed below. Core line 28 is passed through crosshead die 33 of extruding unit 35. Polymer blend pellets are made available at grinding stage 36 whereat the pellets are ground in nitrogen and sifted as discussed hereinabove to the selected particle size. The ground polymer, foaming agent and other components are fed to die 33 through hopper 37 by a single screw elongated mixing screw discussed above to plastic extruder 39. As the polymer mixture passes through the extruder and crosshead die, extrudate melt temperatures are reached depending on the material and the various zone temperature settings selected at control unit 41 for control of band heaters 43 and 45 (additional zones could be utilized if desired).

Die opening 47 typically ranges from 0.025" to 0.060" depending on the weight of line to be produced. Line tapers are achieved by varying the speed at which the core line passes through the die, for example by controlling puller 59 speed and/or the take up speed at reel 49 using motor 51. For example, a 0.052" die opening with a core line speed of about 15 feet per minute and a selected screw speed will produce line diameters up to about 0.066". By increasing line speed to about 30 feet per minute, line diameter drops to between about 0.048 to 0.052". The belly of the lines herein are preferably fed at a rate of between about 10' and 30' per minute producing coating thicknesses up to about 0.040". Core line speeds may vary (and die opening sizes may be adjusted) as necessary to achieve a selected line diameter. For example, coating thicknesses of about 0.006" can be accommodated. To accommodate centering of core line 28 relative to die opening 47 (i.e., so that an even distribution of coating materials is achieved), guider tip 53 of mandrel 54 is moved closer to outlet opening 55 of die holder 57 (to within about 0.060", this gap normally being in the range of about 0.200" for most better known operations).

Cooling begins directly after exit from the die of the coated line at a cooler (a water bath or air bath for example). Thereafter, the line is preferably annealed post extrusion by winding the produced line on a large diameter spool (≈2 feet or greater) and exposing to heat in the range of about 220° to 240° F. for up to about 24 to 48 hours.

Elongated mixing screw design 61 shown in FIG. 3B is a spiral fluted elongational mixing screw having a low resistance flow and conducive to improved foaming. This design incorporates standard screw element segments 63 and mixing/melting segments 65 having mixing channels with a different pitch and spacing from sections 63.

As may be appreciated from the foregoing, the steps taken in formation of the fishing lines of this invention are calculated to assure uniform cell structure of the coating. Specifically, through careful mixing of finely powdered components processed using a newly adapted (to this process) mixer design having an elongated multi-segment screw, better component mixing is obtained to enhance line characteristic options flexibility with regard to lubricity components, density, core selection, tapers, UV incorporation, and coating stiffness/suppleness. Using the methods of this invention, formulation of desired line characteristics based on the these parameters can be accomplished without regard to likely regional temperature where the line is to be used, unlike PVC lines where formulations must be adapted for the temperatures where line use is to occur. Mixing in accord with the methods of this invention produces a uniform foam coating for fishing line applications, and is particularly well adapted to line formation having two or more different line diameters in a single produced line. Use of powdered polymer and blowing agent provides better mixing and line uniformity. Mixing within the extruder barrel is improved (thus further enhancing end product characteristics) by use of the elongated mixing screw design taught herein.

What is claimed is:

1. Fishing line comprising:
   a multifilament fiber core; and
   an outer coating formed from powdered thermoplastic polyester elastomer and a blowing agent applied over said core said outer coating characteriied by a water absorption ratio of less than about 3% (wt).

2. The fishing line of claim 1 wherein said outer coating is characterized by a smooth finish due at least in part to application at a processing temperature less than about 430° F.

3. The fishing line of claim 1 wherein said outer coating is formulated so that said line has a specific gravity of between about 0.75 and 0.88.

4. The fishing line of claim 1 wherein said powdered thermoplastic polyester elastomer is finely ground to a particle size of between about 5 microns and 250 microns.

5. The fishing line of claim 1 wherein said thermoplastic polyester elastomer is a block copolymer of crystalline segment and an amorphous segment based on long chain polyether glycols.

6. The fishing line of claim 1 wherein said thermoplastic polyester elastomer is TPC-ET.

7. The fishing line of claim 1 characterized by utility in climatic conditions with temperature from about −10° F. to 140° F.

8. The fishing line of claim 1 wherein said blowing agent comprises between about 0.25 to 5% of said outer coating to be applied, said outer coating to be applied further including, 0.25 to 8% slip agent concentration, 0.5 to 20% PTFE concentration, and 0.5 to 20% Silicon concentration.

9. The fishing line of claim 8 wherein said blowing agent is about 0.5 to 1.5%, said slip agent concentration is about 1.5%, said PTFE concentration is about 10%, and said Silicon concentration is about 5% of said outer coating.

10. The fishing line of claim 1 wherein said core includes polyester multifilament fiber.

11. A method for manufacturing two component fishing line comprising the steps of:
    pulling a multifilament fiber core through a crosshead die of an extruding unit at a selected rate;
    establishing a mixture of a finely powdered polymer with a blowing agent using an elongated screw of an elongational mixer;
    forming a melt of said mixture at said extruding unit at melt processing temperatures below 430° F.; and
    applying said melt over said core in said extruding unit to form an outer line coating.

12. The method of claim 11 wherein the step of forming said melt is further characterized by processing temperatures between about 280° and 370° F.

13. The method of claim 11 wherein said core is polyester multifilament fiber and wherein said outer line coating is characterized by a water absorption ratio of about 0.6% (wt).

14. The method of claim 11 wherein said polymer is a block copolymer of crystalline segment polybutylene terephthalate and an amorphous segment based on long chain polyether glycol and wherein said blowing agent includes azodicorbonamide, said block copolymer ground in nitrogen to make a powder having a particle size between about 5 microns and 250 microns.

15. The method of claim 11 wherein the step of establishing a mixture includes operating said elongated screw at a screw rotation speed of between about 1 and 5 RPM.

16. The method of claim 11 wherein the step of pulling a multifilament fiber core includes said selected rate being between about 3 and 40 ft/min.

17. The method of claim 11 wherein processing results in crosshead die barrel pressure of about 250 psi during most stages of line production.

18. The method of claim 11 wherein the step of establishing a mixture is further characterized by said blowing agent comprising between about 0.25 to 5% of said mixture.

19. The method of claim 11 further comprising the steps of adding 0.25 to 8% slip agent, 0.5 to 20% PTFE, 0.2% to 5% UV inhibitor, and 0.5 to 20% Silicon to said mixture.

20. The method of claim 19 wherein said blowing agent is about 0.5 to 1.5% of said mixture, and wherein said slip agent concentration is about 1.5%, wherein said PTFE concentration is about 10%, wherein said UV inhibitor concentration is about 0.5%, and wherein said Silicon concentration is about 5% of said mixture.

* * * * *